United States Patent [19]

Gough et al.

[11] Patent Number: 5,667,886
[45] Date of Patent: Sep. 16, 1997

[54] COMPOSITE SHEET HAVING IMPROVED ADHESIVE PROPERTIES AND METHODS OF MAKING SAME

[75] Inventors: Thane Colin Gough, Middlesbrough; Pamela Moira Jeffels, Saltburn; Anthony Garry Harrison, Middlesbrough, all of England

[73] Assignee: Imperial Chemical Industries PLC, United Kingdom

[21] Appl. No.: 525,680

[22] PCT Filed: Apr. 25, 1994

[86] PCT No.: PCT/GB94/00874

§ 371 Date: Sep. 25, 1995

§ 102(e) Date: Sep. 25, 1995

[87] PCT Pub. No.: WO94/25511

PCT Pub. Date: Nov. 11, 1994

[30] Foreign Application Priority Data

Apr. 30, 1993 [GB] United Kingdom ............... 9309024

[51] Int. Cl.⁶ .................................. C08J 7/04; C08J 7/06
[52] U.S. Cl. ............... 428/331; 427/384; 427/387; 427/388.4; 427/397.7; 427/407.1; 427/412.1; 427/412.5; 428/323; 428/341; 428/446; 428/451; 428/483; 428/517; 428/519

[58] Field of Search ........................ 428/446, 451, 428/483, 517, 519, 323, 331, 341; 427/384, 387, 388.4, 397.7, 407.1, 412.1, 412.5

[56] References Cited

U.S. PATENT DOCUMENTS 5,232,755  8/1993  Komiya et al. ............... 428/36.91

FOREIGN PATENT DOCUMENTS

| 0 498 569 A2 | 8/1992 | European Pat. Off. . |
| 0518647A1 | 12/1992 | European Pat. Off. . |
| 4130538A1 | 3/1992 | Netherlands . |
| 1086482 | 10/1967 | United Kingdom . |

*Primary Examiner*—D. S. Nakarani

[57] ABSTRACT

A composite sheet has a substrate layer, a coating layer and a flexible adhesive layer. The substrate layer is preferably a polyester film. The coating layer contains a layer mineral. The flexible adherent layer has a percentage elongation to break of greater that 150%. The composite sheet exhibits oxygen barrier properties and is suitable for use as a packaging film, particularly when laminated to a heat-sealable layer.

20 Claims, 1 Drawing Sheet

COMPOSITE SHEET HAVING IMPROVED ADHESIVE PROPERTIES AND METHODS OF MAKING SAME

FIELD OF THE INVENTION

This invention relates to a composite sheet, and in particular to a composite sheet suitable for use as a packaging material.

BACKGROUND OF THE INVENTION

There is a commercial requirement for packaging materials, especially films for packaging edible products, which exhibit barrier properties, particularly oxygen and water barrier. Existing commercially available packaging films consist of a multiplicity of layers, generally comprising a metallic or polyvinylidene chloride layer to provide the required barrier, particularly oxygen barrier, properties. However, there is presently a perceived requirement for more environmentally acceptable materials than polyvinylidene chloride resins. In addition, coating materials which are less energy intensive than metal, such as aluminium, are required.

Coated materials comprising layer minerals are known. The layer minerals have been used to impart a variety of properties to film substrate materials, such as flame retardancy, antistatic property and gas, particularly oxygen, barrier, as disclosed, for example in Japanese Unexamined Patent Application No 62-181144, EP-A-235926 and U.S. Pat. No. 3,499,820.

Japanese Unexamined Patent Application No 63-233836 discloses a polymeric film having steam and gas barrier properties comprising a coating layer of a laminar silicate and a vinylidene chloride resin.

One particular type of commercially available packaging material, is a film laminate or composite sheet comprising, in order, substrate layer (e.g. polyester film)/polyvinylidene chloride (or metal) coating layer/thermoset polyurethane adherent layer/heat-sealable (e.g. polyethylene) layer.

Unfortunately, when the polyvinylidene chloride (or metal) coating layer, in the aforementioned laminate structure is replaced by a layer mineral coating layer, poor adhesion is observed between the layer mineral layer and the heat-sealable layer, even when the intermediate thermoset polyurethane adherent layer is employed.

SUMMARY OF THE INVENTION

We have now devised a composite sheet comprising a layer mineral coating layer which can exhibit barrier, particularly to oxygen, properties and improved adhesion to a subsequently applied heat-sealable layer.

Accordingly, the present invention provides a composite sheet comprising a substrate layer having on at least one surface thereof a coating layer comprising a layer mineral, the remote surface of said coating layer having thereon a flexible adherent layer having a percentage elongation to break of greater than 150%.

The invention also provides a method of producing a composite sheet by forming a substrate layer, applying to at least one surface thereof a coating layer comprising a layer mineral, and applying to the remote surface of said coating layer a flexible adherent layer having a percentage elongation to break of greater than 150%.

DETAILED DESCRIPTION OF THE INVENTION

A substrate layer for use in the production of a composite sheet according to the invention suitably comprises any film or web material, such as paper, paperboard, or synthetic paper. In a preferred embodiment of the invention the substrate is formed from polymeric material, which is preferably capable of forming a self-supporting opaque, or preferably transparent, film or sheet.

By a "self-supporting film or sheet" is meant a film or sheet capable of independent existence in the absence of a supporting base.

The substrate layer of a composite sheet according to the invention may be formed from any film-forming, polymeric material. Suitable thermoplastics, synthetic, materials include a homopolymer or a copolymer of a 1-olefine, such as ethylene, propylene or butene-1, especially polypropylene, a polyamide, a polycarbonate, and particularly a synthetic linear polyester which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, e.g. ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent 838,708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203. The substrate may comprise a poly(arylene sulphide), particularly poly-p-phenylene sulphide or copolymers thereof. Blends of the aforementioned polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The preferred polymeric film substrate for production of a composite sheet according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, i.e. the forward direction through the film stretching machine, and then in the transverse direction. A stretched substrate film may be, and preferably is, dimensionally stabilised by heat-setting under dimensional restraint at a temperature above the glass transition temperature thereof.

The substrate is suitably of a thickness from 6 to 300, particularly from 6 to 100, and especially from 6 to 25 µm.

The layer mineral preferably comprises platelets of a film-forming, 2:1 phyllosilicate layer mineral. For information on the composition and structure of phyllosilicate layer minerals, reference can be made to "Clay Minerals: Their Structure, Behaviour & Use", Proceedings of a Royal Society Discussion Meeting, 9 & 10 Nov. 1983, London, The Royal Society, 1984 (particularly pages 222–223, 232–235).

The term "platelets" as used in this specification means tiny particles of the layer mineral obtained by subjecting the mineral to a chemical delaminating process to form an aqueous colloidal dispersion of high aspect ratio particles of the mineral from which a film can be formed.

Preferably, the layer mineral is selected from the group consisting of smectites, preferably hectorits and montmorillonite, and particularly vermiculite.

The term "vermiculite" as used in this specification means all materials known mineralogically and commercially as vermiculite. Vermiculite ore being a naturally-occuring mineral contains a mixture of phases (e.g. vermiculite, biotite, hydrobiotite etc) and a mixture of interlayer cations (e.g. $Mg^{2+}$, $Ca^{2+}$, $K^+$). Production of aqueous suspensions or slurries of vermiculite platelets rely on ion exchange (normally incomplete) to generate adequate macroscopic swelling. The swollen, fully- or partially-exchanged vermiculite gel can then be milled to produce a film-forming aqueous suspension of vermiculite platelets. Treatment of vermiculite particles with one or more aqueous solutions of metal (especially alkali metal) salts or alkyl ammonium salts followed by swelling in water and then milling to delaminate the vermiculite is well known and is described for example in GB-A-1016385, GB-A-1119305, GB-A-1585104 and GB-A-1593382, and in U.S. Pat. No. 4,130,687.

Vermiculite is a particularly suitable layer mineral when a composite sheet exhibiting gas barrier, especially oxygen barrier, is required. A composite sheet according to the invention suitably has an oxygen permeability of less than 50, preferably less than 20, more preferably less than 10, particularly less than 5, and especially less than 1 cc/m²/day.

A preferred embodiment of the invention comprises a coating layer of vermiculite platelets wherein greater than 50%, preferably 55 to 99.9%, more preferably 60 to 99%, and particularly 70 to 95% by number of the platelets have a particle size (by which is meant the size of the maximum width of a platelet) in the range 0.5 to 5.0 µm. It is also preferred that 80 to 99.9%, more preferably 85 to 99.9%, and especially 90 to 99.9% by number of the vermiculite platelets have a particle size in the range 0.1 to 5.0 µm. The mean particle size (by which is meant the mean value of the maximum width of the platelets) of vermiculite platelets is preferably 1.0 to 3.0 µm, more preferably 1.2 to 2.2 µm, and especially 1.3 to 1.6 µm. It is also preferred that the vermiculite platelets have a thickness in the range from approximately 10 to 60 Å, especially from approximately 25 to 40 Å. In addition, it is preferred that from 60 to 100%, more preferably from 70 to 99%, and particularly from 90 to 95% by number of vermiculite platelets have a thickness in the range 10 to 60 Å. The mean thickness of vermiculite platelets is preferably 25 to 50 Å, more preferably 25 to 40 Å, and especially 25 to 30 Å.

Although the coating layer can comprise a substantially continuous layer of platelets of any practical thickness, suitably up to 5 µm, preferably up to 2 µm, and more preferably up to 0.5 µm, composite sheets exhibiting desired properties, for example improved barrier property against atmospheric oxygen, comprise a substantially continuous layer of platelets at very low thicknesses, e.g. as low as 0.01 µm, especially in the range from 0.02 µm to 0.3 µm, and particularly in the range from 0.1 µm to 0.25 µm.

In a preferred embodiment of the invention the coating layer additionally comprises at least one material which may be any polymer known in the art to be capable of forming a continuous, preferably uniform coating. The polymeric material is preferably an organic resin and may be any film-forming polymeric or oligomeric species or precursor therefor that assists in forming a film of the layer mineral and does not disrupt the film-forming capability thereof.

Suitable polymeric resins include:

(a) "aminoplast" resins which can be prepared by the interaction of an amine or amide with an aldehyde, typically an alkoxylated condensation product of melamine and formaldehyde, e.g. hexamethoxymethylmelamine, trimethoxy trimethylol melamine formaldehyde;

(b) homopolyesters, such as polyethylene terephthlate;

(c) copolyesters, particularly those derived from a sulpho derivative of a dicarboxylic acid such as sulphoterephthalic acid and/or sulphoisophthalic acid;

(d) copolymers of styrene with one or more ethylenically unsaturated comonomers such as maleic anhydride or itaconic acid, especially the copolymers described in GB-A-1540067;

(e) copolymers of acrylic acid and/or methacrylic acid and;or their lower alkyl (up to 6 carbon atoms) esters, e.g. copolymers of ethyl acrylate and methyl methacrylate, copolymers of methyl methacrylate/buryl acrylate/acrylic acid typically in the molar proportions 55/27/18% and 36/24/40%;

(f) copolymers of styrene/acrylamide, particularly of the type described in GB-A-1174328 and GB-A-1134876;

(g) functionalised polyolefins, especially maleinised polybutadiene;

(h) cellulosic materials such as nitrocellulose, ethylcellulose and hydroxyethylcellulose:

(i) polyvinyl alcohol; and (j) polyurethane resins.

A suitable polymeric resin component of the coating layer comprises an acrylic or methacrylic resin, preferably thermoset and preferably comprising a polymer comprising at least one monomer derived from an ester of acrylic acid and/or an ester of methacrylic acid, especially an alkyl ester of (meth)acrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. The acrylic resin preferably comprises greater than 50 mole %, and preferably less than 98 mole %, especially from 70 to 96 mole %, and particularly from 80 to 94 mole % of at least one monomer derived from an ester of acrylic acid and/or an ester of methacrylic acid, and/or derivatives thereof. Polymers derived from an alkyl acrylate, for example ethyl acrylate and butyl acrylate, together with an alkyl methacrylate are preferred. Polymers comprising ethyl acrylate and methyl methacrylate are particularly preferred The acrylate monomer is preferably present in a proportion in the range 30 to 65 mole %, and the methacrylate monomer is preferably present in a proportion in the range of 20 to 60 mole %.

A preferred acrylic resin, derived from 3 monomers comprises 35 to 60 mole % of ethyl acrylate/30 to 55 mole % of methyl methacrylate/2–20 mole % of methacrylamide, and especially comprising approximate molar proportions 46/46/8% respectively of ethyl acrylate/methyl methacrylate/acrylamide or methacrylamide, the latter polymer being particularly effective when thermoset for example, in the presence of about 25 weight % of a methylated melamine-formaldehyde resin. The acrylic resin is preferably present in the coating layer in the range from 0.5 to 50% by weight of the coating layer.

In a particularly preferred embodiment of the invention the coating layer is formed from a composition comprising a cross-linking agent, by which is meant a material which reacts chemically to form a polymeric resin during formation of the coating layer, preferably forming covalent bonds, both with itself and with the surface of the underlying layer to form cross-links thereby improving adhesion thereto. The cross-linking agent is suitably an organic material, preferably a monomeric and/or oligomeric species, and particularly monomeric, prior to formation of the coating layer. The molecular weight of the cross-linking agent is preferably less than 5000, more preferably less than 2000, especially less than 1000, and particularly in the rates from 250 to 500. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, e.g. melamine, diazins, urea, cyclic ethylene urea, cyclic propylene urea, thiourea, cyclic ethylene thiourea, aziridines, alkyl melamines, aryl melamines, benzo guanamines, guanamines, alkyl guanamines and aryl guanamines, with an aldehyde, e.g. formaldehyde. A preferred cross-linking agent is the condensation product of melamine with formaldehyde. The condensation product may optionally be alkoxylated. A catalyst is also preferably employed to facilitate cross-linking action of the cross-linking agent. Preferred catalysts for cross-linking melamine formaldehyde include para toluene sulphonic acid, maleic acid stabilised by reaction with a base, and morpholinium paratoluene sulphonate.

The coating layer preferably comprises treater than 20% and less than 80%, more preferably greater than 25% and less than 70%, particularly treater than 30% and less than 60%, and especially treater than 30% and less than 50% by weight of the layer of the resin derived by cross-linking the cross-linking agent. The coating layer preferably comprises greater than 20% and less than 80%, more preferably greater than 30% and less than 75%, particularly greater than 40% and less than 70%, and especially greater than 50% and less than 70% by weight of the layer of the layer mineral.

In a further embodiment of the invention the coating layer may additionally comprise a copolymer of a 1-olefine with a vinyl monomer. Suitable 1-olefines include ethylene, propylene and butene-1. Ethylene is particularly preferred. The vinyl monomer is preferably a vinyl ester, such as vinyl chloroacetate, vinyl benzoate, and particularly vinyl acetate. An ethylene/vinyl acetate copolymer is especially preferred. The ratio of the amount of 1-olefine to vinyl monomer present in the copolymer is preferably in the range from 5:1 to 1:5, more preferably 4:1 to 1:2, and especially 3:1 to 1:1. The amount of the copolymer of a 1-olefine with a vinyl monomer is preferably present in the coating layer within the range from 1% to 30%, more preferably from 2% to 20%, particularly from 2.5% to 15%, and especially from 2.3% to 4% by weight of the layer. The copolymer of a 1-olefine with a vinyl monomer is preferably mixed with the layer mineral, prior to adding the cross-linking agent to the coating composition.

The coating layer is formed by applying the coating composition, comprising the layer mineral, and preferably the cross-linking agent, as a slurry or dispersion and removing the dispersion medium to form a coherent layer. Preferably, the dispersion medium comprises water and the slurry or dispersion comprises between 0.5% and 20%, more especially between 1% and 10%, by weight of the layer mineral.

The coating layer composition may be applied before, during or after the stretching operation in the production of an oriented film. The coating layer composition may, for example, be applied to the film substrate between the two stages (longitudinal and transverse) of a thermoplastics film biaxial stretching operation. Such a sequence of stretching and coating may be suitable for the production of a coated linear polyester film substrate, which is preferably firstly stretched in the longitudinal direction over a series of rotating rollers, coated, and then stretched transversely in a stenter oven, preferably followed by heat setting. The coating composition is preferably applied to an already oriented film substrate, such as a biaxially oriented polyester, particularly polyethylene terephthalate film, which is preferably subjected to heating.

The temperature to which the coated film is heated depends, inter alia on the composition of the substrate layer. A coated polyester, especially polyethylene terephthalate, substrate is suitably heated from 100° C. to 240° C., preferably from 150° C. to 180° C., in order to dry the aqueous medium, or the solvent in the case of solvent-applied compositions, and for cross-linking of the layer to occur and also to assist in coalescing and forming the coating into a continuous and uniform layer. In contrast, a coated polyolefin, especially polypropylene, is suitably heated in the range 85° C. to 95° C.

The coating layer composition is preferably applied to the substrate by any suitable conventional technique such as gravure coating, dip coating, bead coating, reverse roller coating or slot coating.

The coating layer is preferably applied to the substrate at a dry coat weight within the range 0.25 to 50 mgdm$^{-2}$, more preferably 0.5 to 20 mgdm$^{-2}$, especially 1.0 to 5.0 mgdm$^{-2}$. For substrates coated on both surfaces, each layer preferably has a coat weight within the preferred range.

The flexible adherent layer preferably comprises a thermoplastic or rubbery polymeric resin material, and is preferably not thermoset. The adherent layer preferably exhibits a percentage elongation to break (/ETB) in the range from 300% to 10,000%, more preferably in the range from 600% to 4000%, particularly in the range from 800% to 2000%, and especially in the range from 1200% to 1700%.

In a preferred embodiment of the invention the adherent layer has a tensile modulus (1% secant modulus) of less than 2.0 MPa, preferably in the range from 0.05 MPa to 1.5 MPa, more preferably in the range from 0.1 MPa to 1.0 MPa, particularly in the range from 0.2 MPa to 0.7 MPa, and especially in the range from 0.25 MPa to 0.45 MPa.

The chemical composition of the polymeric resin of the adherent layer may vary over a relatively wide range of materials. It is the physical properties of the adherent layer; rather than the precise chemical composition which, we believe, is responsible for the surprisingly improved properties of a composite sheet according to the invention, as described herein.

Suitable adherent layer polymeric resins are natural and synthetic rubbers, e.g. where 1,4-polyisoprene is a major component. Other preferred polymeric resins include polyterpene resins, isoprene-piperylene copolymers, styrene-butadiene copolymers, styrene-isoprene block copolymers, rubbery branched or radial block copolymers of conjugated dienes and vinyl aromatic hydrocarbons, cyclic monoolefin copolymers, carboxyl-containing chloroprene polymers, ethylene-vinyl acetate-diolefin-ester copolymers, polyisocyanate modified natural or synthetic rubber, and non-thermoset polyurethane resins.

In a preferred embodiment of the invention, the polymeric resin of the adherent layer is a styrene-butadiene copolymer, preferably a block copolymer. The molar ratio of styrene:butadiene is preferably in the range from 0.1 to 10:1, more preferably in the range from 0.5 to 3:1, and especially in the range from 1.2 to 1.6:1.

The molecular weight of polymeric resin of the adherent layer can vary over a wide range but the weight average molecular weight is preferably within the range 5,000 to 1,000,000, more preferably within the range 10,000 to 500,000, and especially within the range 20,000 to 300,000.

The adherent layer coating composition may comprise other materials used to modify the properties of the resultant adherent layer, such as antioxidants, plasticisers, and tackifying resins.

The polymer(s) of the adherent layer coating composition may be water-soluble or water-insoluble. The adherent layer composition including any water-insoluble polymer may nevertheless be applied to the coating layer surface as an aqueous dispersion or alternatively as a solution in an organic solvent.

The adherent layer composition is preferably applied onto a dried coating layer by any suitable conventional technique such as dip coating, bead coating, reverse roller coating or slot coating.

The adherent layer is preferably dried by heating from 70° C. to 160° C., preferably from 80° C. to 100° C., in order to dry the aqueous medium, or the solvent in the case of solvent-applied compositions, and to assist in coalescing and forming the adherent composition into a continuous and uniform layer.

The adherent layer is preferably applied to the coating layer at a coat weight within the range 10 to 200 mgdm$^{-2}$, more preferably 20 to 150 mgdm$^{-2}$, and especially 50 to 100 mgdm$^{-2}$.

The thickness of the dried adherent layer is preferably in the range from 1 μm to 20 μm, more preferably 2 μm to 15 μm, and especially 5 μm to 10 μm.

In one embodiment of the invention, an additional primer layer is applied to the substrate layer prior to coating with the layer mineral coating layer. The presence of the primer layer can result in an improvement in the adhesion of the coating layer to the substrate and/or an improvement in barrier properties, particularly oxygen barrier.

The primer layer comprises at least one polymeric resin which may be any polymer known in the art to be capable of forming a continuous, preferably uniform, coating, being adherent to the supporting substrate, and preferably exhibiting optical clarity. Polymeric resins which are suitable for forming the primer layer include all the polymeric resins disclosed herein for use in the coating layer.

A preferred polymeric resin component of the primer layer comprises a copolymer comprising acrylamide and/or a derivative thereof, such as a lower alkoxy, preferably n-butoxy, and/or methacrylamide and/or a derivative thereof, such as a lower alkoxy, preferably n-butoxy, and at least one other ethylenically unsaturated comonomer copolymerisable therewith, including acrylic acid and its esters, including alkyl esters, for example methyl acrylate, ethyl acrylate, butyl acrylate, 2-ethyl-hexyl acrylate, isobutyl acrylates, hexyl acrylates and octyl acrylates; methacrylic acid and its esters for example methyl methacrylate, ethyl methacrylate and butyl methacrylate. Other suitable monomers include acrylonitrile, styrene, monomethyl styrene, vinyl toluene, maleic anhydride, and vinyl ethers. Styrene and alkyl acrylates are particularly preferred monomers. Dienes such as butadiene or chloroprene may also be present in the primer layer copolymer.

The primer layer copolymer preferably comprises at least one free functional acid (for example a pendant carboxyl or sulphonate group) group, that is a group other than those involved in the polymerisation reaction by which the copolymer is formed, such as acrylic acid, methacrylic acid, maleic acid and itaconic acid. Suitably up to 25%, preferably up to 10%, and especially up to 5% by weight of comonomer containing a free functional acid group may be employed.

The polymeric resin component of the primer layer preferably comprises a copolymer derived from up to 90% by weight of styrene, up to 80% by weight of an alkyl acrylate, up to by weight of methacrylic acid, and from 5% to 40% by weight of acrylamide which has been condensed with a solution of formaldehyde in n-butanol containing from 0.2 to 3 equivalents of formaldehyde for each amide group in the copolymer. A particularly preferred copolymer comprises styrene/2-ethyl hexyl acrylate/methacrylic acid/n-butoxymethyl acrylamide in a ratio of 20 to 40/30 to 50/1 to 5/20 to 35% by weight. GB-A-1174328 and GB-A-1134876 describe suitable methods for the synthesis of the aforementioned primer layer copolymers.

The polymeric resin of the primer layer is preferably compatible with, and includes, an additional acidic component, such as sulphuric, nitric, acetic acid or any mineral acid, such as hydrochloric acid, in the primer layer coating composition. The additional acidic component is preferably present in the primer layer coating composition in a concentration range from 0.5 to 15, more preferably 1 to 10, and especially 4 to 8% by weight relative to the weight of the polymeric resin. Sulphuric acid is a preferred acidic component.

In an alternative embodiment of the invention the polymeric resin component of the primer layer comprises the acrylic or methacrylic resin described hereinbefore as a suitable polymeric resin component of the coating layer. A preferred acrylic resin comprises 35 to 60 mole % of ethyl acrylate/30 to 55 mole % of methyl methacrylate/2–20 mole % of methacrylamide, and especially comprising approximate molar proportions 46/46/82% respectively of ethyl acrylate/methyl methacrylate/acrylamide or methacrylamide, the latter polymer being particularly effective when thermoset for example, in the presence of about 25 weight % of a methylated melamine-formaldehyde resin.

The molecular weight of polymeric resin of the primer layer can vary over a wide range but the weight average molecular weight is preferably within the range 10,000 to 300,000, and more preferably within the range 15,000 to 100,000.

The polymer(s) of the primer layer coating composition is generally water-insoluble. The primer layer composition including the water-insoluble polymer may nevertheless be applied to the substrate as an aqueous dispersion or alternatively as a solution in an organic solvent.

The primer layer coating medium my be applied before, during or after any stretching operation used in the production of a polymeric substrate. In particular, the coating medium my be applied to the polymeric film substrate between the two stages (longitudinal and transverse) of a biaxial stretching operation. Such a sequence of stretching and coating is suitable for the production of a coated linear polyester film substrate, such as a coated polyethylene terephthalate film, which is preferably firstly stretched in the longitudinal direction over a series of rotating rollers, coated, and then stretched transversely in a stenter oven, preferably followed by heat setting.

The primer layer coating composition may be applied to the substrate as an aqueous dispersion or solution in an organic solvent by any suitable conventional coating technique such as dip coating, bead coating, reverse roller coating or slot coating.

The primer layer coating medium is preferably applied to an already oriented polymeric film substrate, such as a biaxially oriented polyester, particularly polyethylene terephthalate film.

Prior to deposition of the primer layer or coating layer onto the substrate, the exposed surface thereof may, if desired, be subjected to a chemical or physical surface-modifying treatment to improve the bond between that surface and the subsequently applied primer or coating layer. A preferred treatment, because of its simplicity and effectiveness, which is particularly suitable for the treatment of a polyolefin substrate, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The primer layer is preferably applied to the substrate at a coat weight within the range 0.1 to 10 mgdm$^{-2}$, especially 1.0 to 6 mgdm$^{-2}$. For substrates coated on both surfaces, each layer preferably has a coat weight within the preferred range.

Modification of the surface of the primer layer, e.g. by flame treatment, ion bombardment, electron beam treatment, ultra-violet light treatment or preferably by corona discharge, may improve the adhesion of the subsequently applied coating layer comprising a layer mineral, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

The ratio of substrate to primer layer thickness may vary within a wide range, although the thickness of the primer layer preferably should not be less than 0004% nor greater than 10% of that of the substrate. In practice, the thickness of the primer layer is desirably at least 0.005 µm and preferably should not greatly exceed about 1.0 µm.

A composite sheet according to the invention is suitably coated with, or laminated to, a heat-sealable layer in order to form a packaging film laminate. The heat-sealable layer comprises polymeric material which preferably should be capable of forming a heat-seal bond to itself or to the substrate, or preferably to both, by heating to soften the polymeric material of the heat-sealable layer and applying pressure without softening or melting the material of the substrate layer. The heat-sealable layer suitably has a heat-seal strength to itself of greater than 500 g/25 mm (196 Nm$^{-1}$), preferably in the range from 800 to 5000 g/25 mm (314 to 1960 Nm$^{-1}$), more preferably 1000 to 4000 g/25 mm (392 to 1568 Nm$^{-1}$), and particularly 1500 to 3000 g/25 mm (588 to 1176 Nm$^{-1}$). The heat-seal strength can be measured by sealing the heat-sealable layer to itself at 140° C. for 1 second under a pressure of 103 kPa (15 psi), cooling to room temperature, and measuring the force required under linear tension per unit width of seal to peel the sealed films apart at a constant speed of 4.23 mm/second.

A heat-sealable layer suitably comprises a polyester or polyolefin resin. Suitable polyesters include copolyester resins, especially those derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory heat-sealable properties are those of ethylene terephthalate and ethylene isophthalate, especially in the molar ratios of from 50 to 90 mole % ethylene terephthalate and correspondingly from 50 to 10 mole % ethylene isophthalate.

A polyolefin resin, particularly polyethylene is a preferred component of the heat-sealable layer.

Formation of a heat-sealable layer on the adherent layer may be effected by applying a polymeric resin as an aqueous dispersion or solution in an organic solvent, by any suitable conventional coating technique such as dip coating, bead coating, reverse roller coating or slot coating. Alternatively, the heat-sealable layer may be extrusion coated. Preferably a preformed heat-sealable layer film, particularly a polyethylene film, is laminated to a composite sheet according to the invention, by passing through a heated nip roll.

The heat-sealable layer preferably has a thickness of up to 100 µm, more preferably greater than 10 µm, and especially from 35 µm to 70 µm.

One or more of the layers of a composite sheet according to the invention, i.e. substrate, primer, coating, adherent and/or heat-sealable layer(s), may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated into one or more of the aforementioned layers as appropriate. In particular, a substrate may comprise a particulate filler, such as silica, of small particle size. Desirably, a filler, if employed in a substrate layer, should be present in a small amount not exceeding 0.5% preferably less than 0.2%, by weight of the substrate.

BRIEF DESCRIPTION OF THE DRAWINGS

The invention is illustrated by reference to the accompanying drawings in which:

Referring to FIG. 1 of the drawings, the film comprises a substrate layer (1) having a coating layer (2) bonded to one surface (3) thereof. An adherent layer (4) is bonded to the remote surface (5) of the coating layer (2).

Figure 1:
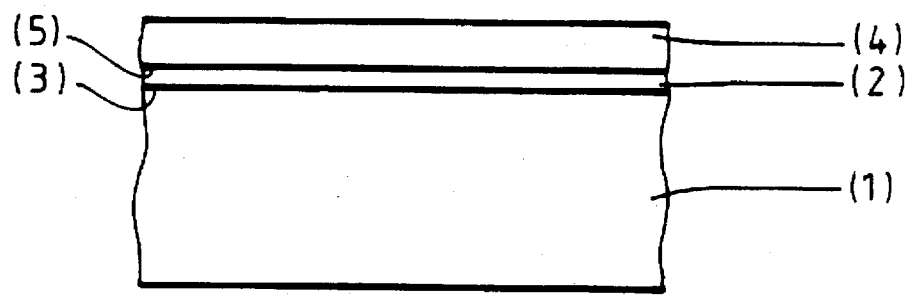
FIG. 1 is a schematic sectional elevation, not to scale, of a composite sheet having a substrate, coating and adherent layers.
Figure 2:
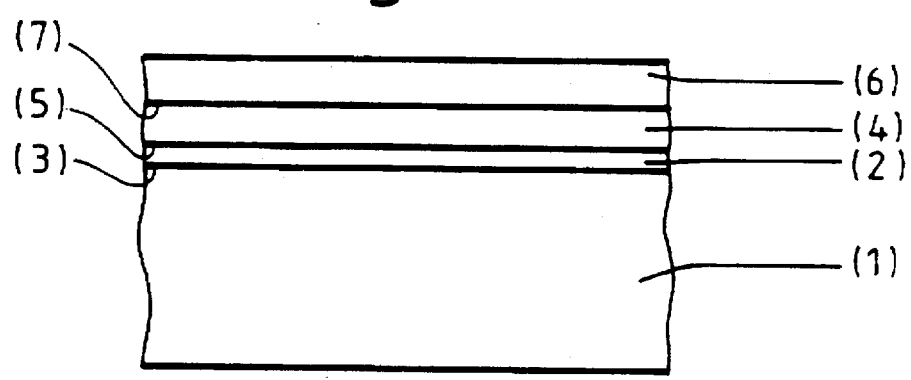
FIG. 2 is a similar schematic elevation of a film as shown in FIG. 1, with an additional heat-sealable layer on the remote surface of the adherent layer.
Figure 3:
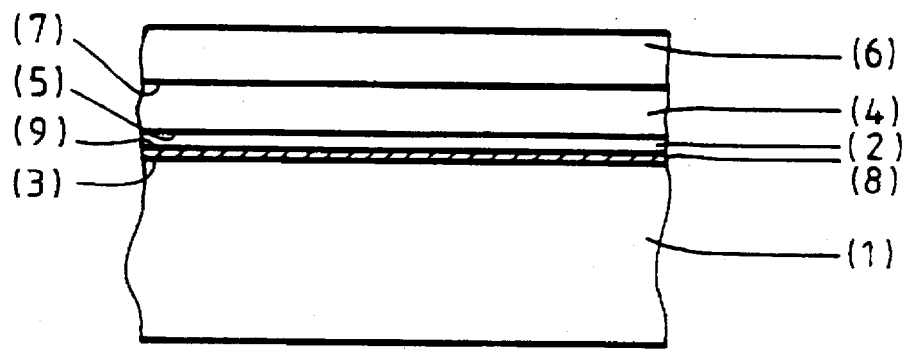
FIG. 3 is a similar schematic elevation of a film as shown in FIG. 2, with an additional primer layer between the substrate and coating layers.

The film of FIG. 2 further comprises an additional heat-sealable layer (6), bonded to the remote surface (7) of the adherent layer (4).

The film of FIG. 2 further comprises an additional primer layer (8), bonded to the surface (3) of the substrate (1) and the surface (9) of the coating layer (2).

The invention is further illustrated by reference to the following examples.

EXAMPLE 1

A vermiculite suspension was prepared in accordance with the following method:

100 g of vermiculite ore (ex-Carolina, U.S.) was refluxed with 1 liter of 1N lithium citrate solution at 80° C. for four hours and left at room temperature for five days. This resulted in the exchange of 45.3 mEq/100 g of lithium cations in the ore. The ion-exchanged vermiculite ore was washed 5 times with deionised water to remove the excess salts and left overnight to swell in a large volume (i.e. 10 times the volume of vermiculite) of deionised water. The swollen vermiculite was milled for 40 minutes in a Greaves high-shear mixer at 7200 rpm to produce a suspension of vermiculite platelets. The platelet suspension was then sieved by passing through a mechanically agitated filter having a pore size of 106 μm.

A polyethylene terephthalate film was melt extruded, cast onto a cooled rotating drum and stretched in the direction of extrusion to approximately 3 times its original dimensions. The film was passed into a stenter oven, where the film was stretched in the sideways direction to approximately 3 times its original dimensions. The biaxially stretched film was heat set at a temperature of about 220° C. by conventional means. Final film thickness was 23 μm.

The biaxially oriented polyethylene terephthalate film was coated on one side using a gravure coater, with a coating layer composition comprising the following ingredients:

| | |
|---|---|
| Vermiculite (7.5% w/w aqueous dispersion) | 6 l |
| Cymel 385 (melamine formaldehyde of molecular weight 348) | 375 ml |
| Para toluene sulphonic acid (10% w/w aqueous solution) | 216 ml |
| Synperonic NP 10 (10% w/w aqueous solution of a nonyl phenol ethoxylate, supplied by ICI) | 100 ml |
| Demineralised water | to 10 liters |

The coated film was dried at 180° C., and the dry coat weight of the coating layer was approximately 2 mgdm$^{-2}$. The thickness of the coating layer was approximately 0.2 μm.

A composite sheet was formed by coating the remote surface of the layer mineral coating layer, using a gravure coater, with an adherent layer composition comprising the following ingredient:

Rubber based resin (Product No 10-2060, supplied by Holden Surface Coatings Ltd, England)

The adherent layer coated film was dried at 90° C., and the dry coat weight of the adherent layer was approximately 100 mgdm$^{-2}$. The thickness of the adherent layer was approximately 8 μm.

The tensile modulus and ZETB of the adherent layer were measured by first of all casting, onto a release film, a sample of the adherent layer composition. After drying, the sample of adherent layer was peeled away from the release film, and used to measure the tensile modulus and ZETB. The tensile modulus 1% secant modulus) and ZETB of the adherent layer sample (30 mm long, 15 mm wide and 2 mm thick) were measured using an Instron Model 1122 Universal Testing Machine at 23° C. and 50% relative humidity. A displacement rate of 10 mm min$^{-1}$ was used to measure the tensile modulus, and a displacement rate of 50 mm min$^{-1}$ was used to measure the ZETB.

The adherent layer sample exhibited a tensile modulus of 0.35 MPa and a ZETB of 1552%.

The oxygen barrier property of the composite sheet (substrate/coating/adherent layers) was determined by measuring the oxygen permeability using a Mocon 1050 (Modern Controls Inc.) test instrument. A sample of the composite sheet was placed in the machine with the nitrogen carrier gas (containing 1% hydrogen) flowing both above and below the sheet, in order that a background reading can be obtained. The nitrogen above the sheet was replaced by oxygen, and the amount of oxygen able to permeate through the sheet was measured in a carrier gas by using a sensor. The oxygen permeability was 1.5 cc/m$^2$/day. The oxygen permeability of uncoated polyethylene terephthalate film was also measured and found to be 50.0 cc/m$^2$/day.

The strength of adhesion of the composite sheet to a heat-sealable layer was measured by laminating the adherent layer surface of the composite sheet with a 50 μm polyethylene film, by passing the two films through a nip heated at 70° C. The adhesion was measured by peeling apart the resulting laminate using an "Instron" Tensometer at a displacement rate of 50 mm min$^{-1}$. The peel strength was 220 g/25 mm (86 Nm$^{-1}$).

EXAMPLE 2

This is a comparative example not according to the invention. The procedure of Example 1 was repeated except that the adherent layer composition comprised the following ingredients:

| | |
|---|---|
| Polyurethane prepolymer (Product No 10-2525/3, supplied by Holden Surface Coatings Ltd, England) | 69 parts |
| Polyhydric alcohol (Product No 10-2526/3 supplied by Holden Surface Coatings Ltd, England) | 1 part |

The adherent layer coated film was dried at 90° C., and the dry coat weight of the adherent layer was approximately 30 mgdm$^{-2}$. The thickness of the adherent layer was approximately 3 μm.

The tensile modulus and ZETB of the adherent layer were measured as described in Example 1. The adherent layer sample exhibited a tensile modulus of 2.3 MPa and a % ETB of 91.5%.

The oxygen barrier property of the composite sheet was determined as described in Example 1, and the oxygen permeability was 1.5 cc/m$^2$/day.

The strength of adhesion of the composite sheet to a heat-sealable layer was also determined as described in Example 1, and the peel strength was less than 10 g/25 mm (less than 4 Nm$^{-1}$).

The above examples illustrate the improved properties of a composite sheet according to the present invention.

We claim:

1. A composite sheet comprising a substrate layer having on at least one surface thereof a coating layer comprising a layer mineral, the remote surface of said coating layer having thereon a flexible adherent layer having a percentage elongation to break of greater than 150% and a tensile modulus (1% secant modulus) of less than 2.0 MPa.

2. A composite film according to claim 1 wherein the adherent layer has a tensile modulus (1% secant modulus) in the range from 0.05 to 1.5 MPa.

3. A composite sheet according to claim 2 wherein the adherent layer has a tensile modulus in the range from 0.25 to 0.45 MPa.

4. A composite sheet according to claim 1 wherein the adherent layer has a percentage elongation to break in the range from 300% to 10,000%.

5. A composite sheet according to claim 1 wherein the adherent layer comprises a styrene-butadiene copolymer.

6. A composite sheet according to claim 5 wherein a molar ratio of styrene to butadiene in the styrene-butadiene copolymer is in the range from 0.1 to 10:1.

7. A composite sheet according to claim 6 wherein the molar ratio is in the range of from 0.5 to 3:1.

8. A composite sheet according to claim 1 wherein the layer mineral comprises platelets of a film-forming, 2:1 phyllosilicate.

9. A composite sheet according to claim 8 wherein the 2:1 phyllosilicate comprises vermiculite.

10. A composite sheet according to claim 9 wherein greater than 50% of the vermiculite has a particle size in the range of 0.5 to 5.0 microns.

11. A composite sheet according to claim 10 wherein from 70 to 95% of the vermiculite platelets has a particle size in the range of 0.5 to 5.0 microns.

12. A composite sheet according to claim 9 wherein 80 to 99.9% of the vermiculite has a particle size in the range of 0.1 to 5.0 microns.

13. A composite sheet according to claim 1 wherein the coating layer additionally comprises a cross-linking agent.

14. A composite sheet according to claim 13 wherein the cross-linking agent has a molecular weight of less than 5,000.

15. A composite sheet according to claim 14 wherein the cross-linking agent is the condensation product of melamine with formaldehyde.

16. A composite sheet according to claim 1 wherein an additional heat-sealable layer is present on the surface of the adherent layer, remote from the coating layer.

17. A composite sheet according to claim 1 wherein the substrate layer is a polymeric film.

18. A composite sheet according to claim 1 wherein the coating layer additionally comprises a copolymer of ethylene and vinyl acetate.

19. A method of producing a composite sheet by forming a substrate layer, applying to at least one surface thereof a coating layer comprising a layer mineral, and applying to the remote surface of said coating layer a flexible adherent layer having a percentage elongation to break of greater than 150% and a tensile modulus (1% secant modulus) of less than 2.0 MPa.

20. A method according to claim 19 wherein the coating layer is applied to the substrate layer at a dry coat weight in the range of 0.25 to 50 mg/dm$^2$.

* * * * *